(12) United States Patent
Leonard

(10) Patent No.: US 7,320,038 B1
(45) Date of Patent: Jan. 15, 2008

(54) METHOD AND APPARATUS FOR INTERFACING A LAN TO A DRIVE

(75) Inventor: John Andrew Leonard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 1418 days.

(21) Appl. No.: 09/722,049

(22) Filed: Nov. 27, 2000

(51) Int. Cl.
*G06F 15/16* (2006.01)
*G06F 13/24* (2006.01)
*G06F 13/00* (2006.01)

(52) U.S. Cl. .................. 709/250; 710/260; 711/149
(58) Field of Classification Search .............. 700/22; 709/250, 200, 212, 216; 710/8, 260, 305; 711/149, 203
See application file for complete search history.

(56) References Cited

U.S. PATENT DOCUMENTS

| | | | |
|---|---|---|---|
| 5,708,828 A | 1/1998 | Coleman | 395/785 |
| 5,737,638 A | 4/1998 | Byrn et al. | 395/888 |
| 5,748,924 A | 5/1998 | Llorens et al. | 395/309 |
| 5,905,885 A | 5/1999 | Richter et al. | 395/500 |
| 6,105,119 A * | 8/2000 | Kerr et al. | 711/219 |
| 6,275,741 B1 * | 8/2001 | Choi | 700/200 |
| 6,523,102 B1 * | 2/2003 | Dye et al. | 711/170 |
| 6,745,107 B1 * | 6/2004 | Miller | 700/282 |

OTHER PUBLICATIONS

GEH-6371, Unit Controller 2000\VME, Operation and Maintenance by General Electric Company Mar. 1997.*
GEH-6380, Installation Guidence for Innovation Series Drive Systems by General Electric Company June 30, 1999.*
GFK-0728A, Programmable Controller IC697BEM763/764 by International Business Machines Corporation Nov. 1, 1995.*
GEH-6404B, Control Systems Toolbox for AC200 and DC2000 by General Electric Company Apr. 3, 2000.*
GEI-100216, Drive Control/LAN Communications Board by General Electric Company May 1997.*

* cited by examiner

*Primary Examiner*—Glenton B. Burgess
*Assistant Examiner*—Yasin M Barqadle
(74) *Attorney, Agent, or Firm*—Hunton & Williams

(57) ABSTRACT

An interface card connects a LAN with a drive. The interface card comprises a dual port memory interface, which interfaces to the main control card of the drive. An interrupt line informs a communication processor on the main control card to update feedbacks in the dual port memory and read the set points from the dual port memory. Special control registers interface the communication processor with the LAN. The apparatus also facilitates a method for interfacing the drive to the LAN without modifying the main control card of the drive.

11 Claims, 4 Drawing Sheets

METHOD AND APPARATUS FOR INTERFACING A LAN TO A DRIVE

FIELD OF THE INVENTION

The present application relates to a method and apparatus for interfacing a drive to a local area network (LAN) and in particular for interfacing an AC/DC 2000 drive to a LAN.

BACKGROUND OF THE INVENTION

It has been common practice to interface a drive to a LAN using hardware designed into the main control card of the drive. Such an approach requires hardware redesign in order to interface the drive to multiple different types of LANs. Additionally, special interface code is often required in the communications processor of the main control of the drive. Thus, the firmware of the main control card of the drive must be modified in order to interface with the LAN. Furthermore, these prior approaches frequently do not allow multiple types of drives to be connected to a LAN and controlled by a master controller.

Examples of the existing technology include interfaces for connecting the AC/DC 2000 drive to the GE Drive Local Area Network (GE DLAN) and GE Drive Local Area Network Plus (GE DLAN Plus) using hardware designed into the main control card (LDCC). Another known interface is the AC/DC2000 Drive to Genius LAN Interface (ADGI) card which interfaces the AC/DC 2000 drive to the GE Fanuc bus-Genius bus. This interface requires special interface code in the communication processor (LCP) of the ADGI card. The special interface code is not generally applicable to other LANs.

Another known interface is the AC/DC2000 Drive to Cbus, Fbus and CPL LAN Interface (ADCI) card, which uses a dual port memory approach for interfacing the AC/DC 2000 Drive to specific LANs. The ADCI card also uses special LCP code, which is not generally applicable to multiple types of LANs.

In view of the deficiencies described above in the known interfaces, an alternative is required which is generally applicable for interfacing a drive to a LAN, and in particular, for interfacing an AC/DC2000 drive to multiple types of LANs including an Innovation Series Control Bus (ISBus) LAN.

SUMMARY OF THE INVENTION

In accordance with the purpose of the invention as embodied and broadly described herein, there is provided an interface card for interfacing a drive to a LAN without modifying a main control card of the drive. The interface card comprises a dual port memory interface to the main control card of the drive for receiving feedback and transmitting setpoints. The interface card additionally comprises an interrupt line that informs a communication processor connected to the main control card of the drive to update the feedbacks in the dual port memory and read the setpoints from the dual port memory. The interface card also comprises control registers for interfacing the communication processor to the LAN.

In another aspect of the invention, a method for interfacing a drive to a LAN without modifying a main control card of the drive is provided, wherein the main control card includes a communications processor and a main processor. The method comprises the steps of triggering an interrupt to notify the communications processor on the main control card to update the feedbacks in the dual port memory and read the setpoints from the dual port memory and transmitting the setpoints from the dual port memory interface to the main processor on the main control card. The method further comprises the steps of transmitting the feedback from the main processor on the main control card to the dual port memory interface and interfacing the communications processor to the LAN with control registers.

In yet another aspect of the invention, an interface card for interfacing a drive to a LAN is provided. The interface card comprises a dual port random access memory having control registers. An ASIC is connected with the dual port random access memory. Bus driving components connect the ASIC with the LAN. An interrupt line transmits communication between the communication processor on the main control card of the drive, the ASIC, and the dual port random access memory.

In yet a further aspect of the invention, a method for interfacing a drive to a LAN is provided. The method comprises the steps of providing an interface card having an ASIC, a dual port memory, and an interrupt line, wherein the interrupt line transmits an interrupt signal generated by the ASIC to the communication processor. The method additionally comprises the steps of updating feedbacks in the inactive page of the dual port memory, swapping active and inactive pages, loading setpoints, writing feedbacks to a new active page, and reading setpoints from the inactive page.

These and other features, objects, and advantages of the preferred embodiments will become apparent when the detailed description of the preferred embodiments is read in conjunction with the drawings attached hereto.

DETAILED DESCRIPTION OF THE PREFERRED EMBODIMENT

Figure 1:
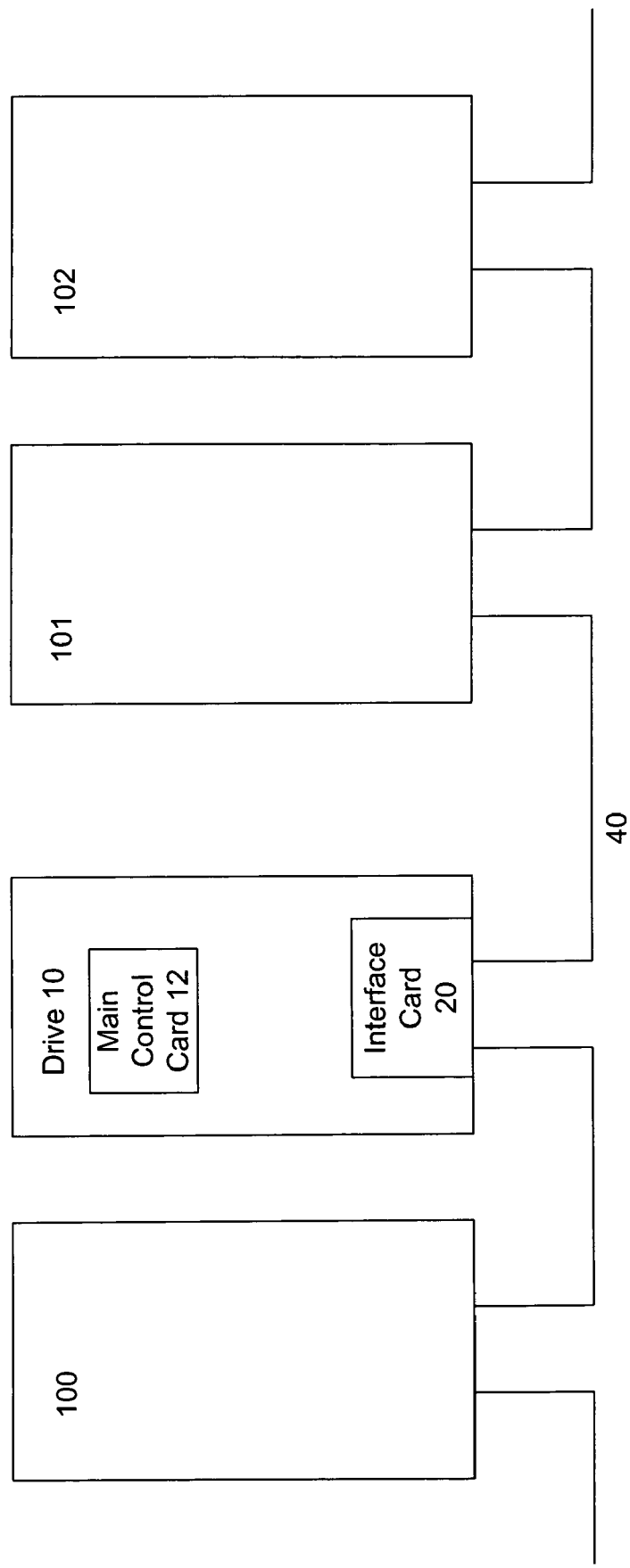
FIG. 1 is a block diagram illustrating an embodiment of the interface card of the invention connected with a drive and a LAN.

Reference will now be made in detail to the present preferred embodiments of the invention, examples of which are illustrated in the accompanying drawings in which like reference numerals refer to corresponding elements.

Figure 2:
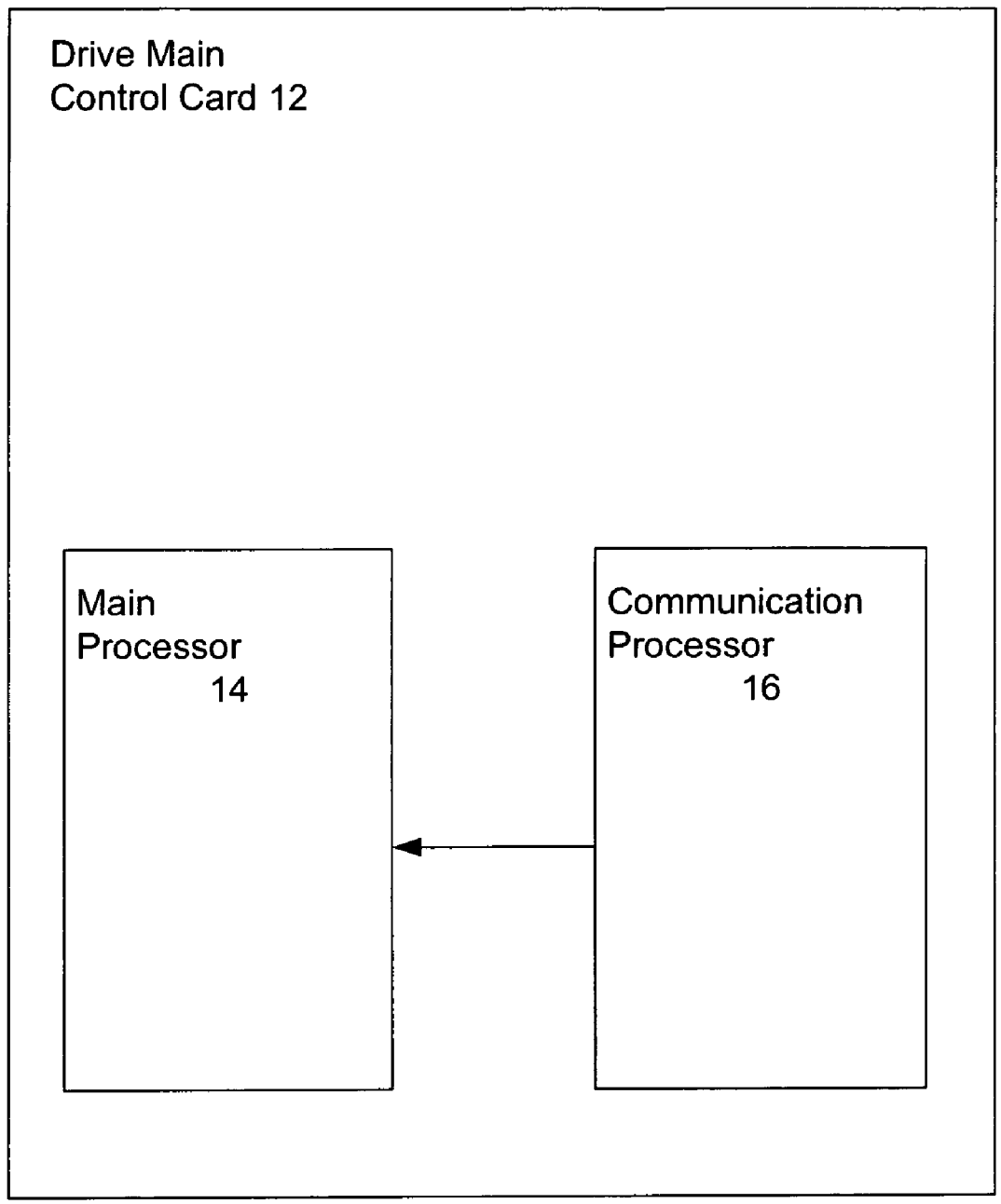
FIG. 2 is a block diagram illustrating an embodiment of the main control card of the drive.

FIG. 1 is a block diagram illustrating a drive 10 connected to a LAN 40. Other drives 100, 101, 102, etc. are preferably also connected to the LAN 40 and may include multiple types of drives. The drive 10 includes a main control card 12 and an attached interface card 20 for interfacing with the LAN 40. The drive main control card 12 is illustrated in greater detail in FIG. 2, in which a main processor 14 located on the main control card 12 receives information from a communication processor 16 located on the main control card 12.

Figure 3:
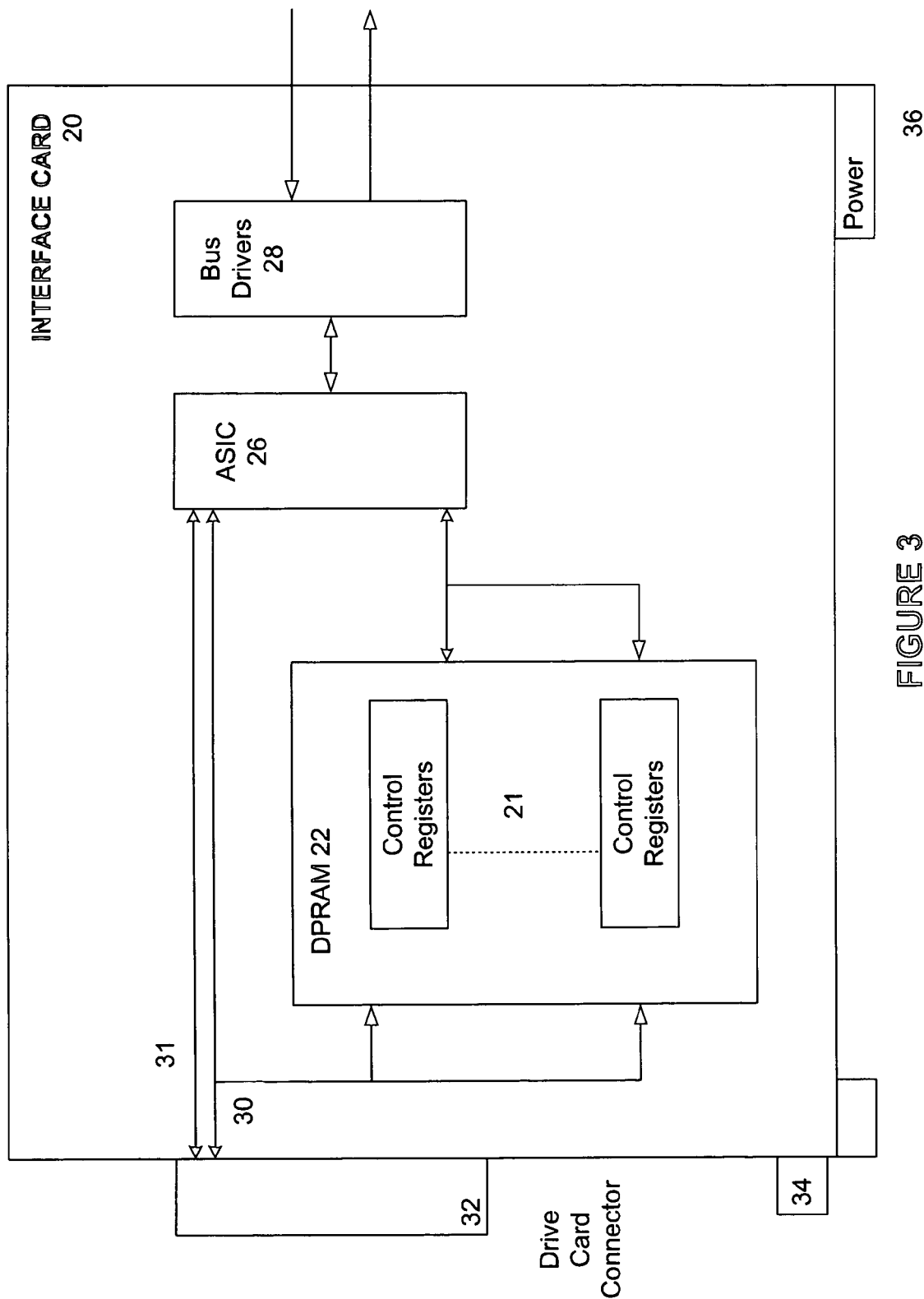
FIG. 3 is a block diagram illustrating an embodiment of the interface card of the invention.

FIG. 3 illustrates an embodiment of the interface card 20 in greater detail. A dual port RAM (DPRAM) 22 communicates with the LAN 40 via an applications specific integrated circuit (ASIC) 26 and bus driver 28. The DPRAM 22 is preferably 2048 bytes in length. The DPRAM 22 includes special control registers 21 which allow for control of the interface card 20. The control registers 21 are preferably located at address space 0000h and preferably use LNCS2 chip select. LNCS2 is an address chip select TTL line coming from the communications processor 16. The DPRAM 22 is preferably an 8 bit data bus through an LNPL connector 32 to the communication processor 16. A memory map of the control registers 21 on the interface card 20 is provided in greater detail in Table 1 below. Definitions for all of the nomenclature and parameters contained herein can be found in the GE Reference Manual for ISBus ASICS, authored by Jordan Castell and Bruce Henderson.

TABLE 1

CONTROL REGISTERS DEFINITION

| ADDRESS | PARAMETER | LCP LOADS WITH | DESCRIPTION (For more information, please refer to the GE "Reference Manual for ISBus ASIC", in particular ASIC #2) | |
|---|---|---|---|---|
| 0h | AREV | Firmware Revision Area | N.A. | |
| 4h | HR2 | | N.A. | |
| 8h | XDATA | | N.A. | |
| Ch | HR3 | 0000 0380h | LCP writes: Rbus=8 bits, Xbus=16 bits, Wdog T.O. = 8msec | |
| 10h | HR4 | | N.A. | |
| 40h | CR0 | @init➔ Read CR0 Write 8000 0000h Write 8000 0003h Read CR0 @Runtime➔ Read CR0, If CR0 11 FFFF 00C0h Does not equal zero, Then Fault and Write 8000 0003h (1I ➔ logical and) | LCP Writes: Loaded at Init and Run Time Bit.2-.0 Bit.31 LCP Reads: Read at Run Time Bit.15-.14 Bit.30-.16 Bit.31 | = 000→Reset, 001→Off line, = 010→standby, 011→online = Clear Faults (LCP sets, LAN card clears) = a non-zero in these bits will result in the drive fault "FL448 LADIIRTM". = Fault Code (a non-zero will result in the drive fault "FL448 LADIIRTM") = a non-zero in this bit will result in the drive fault "FL44 LADIIRTM". |
| 44h | CR1 | | LCP Reads: Read at Run Time Bit.15-.0 | = LCP reads the Error count and stores away into private ram space for debug capability |
| 48h | CR2 | 0000 0000h | LCP writes: NA. Loaded at Init | |
| 4Ch | CR3 | | N.A. | |
| 50h | CR4 | 6408 0000h | LCP writes: N.A. Loaded at Init | |
| 54h | CR5 | 0020 83E7h | LCP Writes: N.A. Loaded at Init | |
| 58h | CR6 | | N.A. | |
| 5Ch | CR7 | | N.A. | |
| 60h | CR8 | | N.A. | |
| 64h | CR9 | 0000 1000h or 0000 1040h | LCP Writes: Loaded at Init and Run Time This gives the page number used in the dual port memory. The LAN card will read & write to the page given in this register (1000h=pg0, 1040h=pg1) | |
| 68h | CR10 | | N.A. | |
| 6Ch | CR11 | xx02 0002h | LCP Writes: Loaded at Init Bit.30-.26 = the node address (EE_ADINID) | |
| 70h | CR12 | xx02 0004h | LCP Writes: N.A. Loaded at Init Bit.30-.26 = the node address (EE_ADINID) | |
| 74h | CR13 | xx02 0006h | LCP Writes: N.A. Loaded at Init Bit.30-.26 = the multicast address (EE_ADIMID) | |
| 78h | CR14 | dddd ddddh 0000 2409h (@init) | LCP Writes: Loaded at Init and Run Time LCP sets Bit.0 and Bit.3 to a one to flush the FIFOs. LCP Reads: Read at Run Time Bit.0 = 1 asynchronous TxFIFO is empty Bit.3 = 1 asynchronous RxFIFO is empty The LAN card interface should keep these bits set to a one. Bit.2-.0 = 001 binary Bit.5-.3 = 001 binary | |

TABLE 1-continued

CONTROL REGISTERS DEFINITION

| ADDRESS | PARAMETER | LCP LOADS WITH | DESCRIPTION (For more information, please refer to the GE "Reference Manual for ISBus ASIC", in particular ASIC #2) |
|---|---|---|---|
| 7Ch | CR 15 | | LCP Writes/Reads: Write/Read at Run Time only if the asyncronous FIFOs are being used. For most LAN card interfaces, this register should be ignored. |

All of the above-identified control registers 21 are 32 bit parameters. The communication processor 16 writes four bytes to each control register 21 and reads four bytes from each control register 21. Furthermore, additional control registers may also be provided that fit within the 2048 bytes of the dual port RAM 22.

As shown in FIG. 3, the LNPL connector 32 connects the interface card 20 with the main control card 12 of the drive 10. The LNPL connector 32 and passes digital control, address, and data lines to and from the main control card 12 and the interface card 20. The LNPL connector pins between the main control card 12 and the interface card 20 are shown in Table 2 below.

TABLE 2

LNPL Connector Definition

| Pin No. | Nomenclature | Description |
|---|---|---|
| 1, 2 | DCOM | Digital common ground |
| 3-10 | LND0-LND7 | LAN card data signals (d0-d7) |
| 11 | DCOM | Digital common ground |
| 12 | LNRST | Reset signal going to LAN card |
| 13 | LNINT | LAN card interrupt (LAN card to LCP) |
| 14 | DCOM | Digital common ground |
| 15 | LNRDY | Ready/Busy signal from LAN card DPRam |
| 16 | DCOM | Digital common ground |
| 17 | LNALE | N.C. |
| 18 | DCOM | Digital common ground |
| 19 | LNRD | Read control signal to LAN card |
| 20 | LNWR | Write control signal to LAN card |
| 21 | DCOM | Digital common ground |
| 22-34 | LNA0-LNA12 | LAN card address signals (a0-a12) |
| 35 | P5 | +5Vdc |
| 36 | LNACS | N.C. |
| 37 | LNCS1 | LAN card DPRam select |
| 38 | LNCS2 | LAN card control registers select |
| 39, 40 | DCOM | Digital common ground |

As shown in Table 2, pin nos. 1, 2, 11, 14, 16, 18, 21, 39 and 40 are digital common ground (DCOM) pins. Pin number 12 transmits a reset signal from the main control card 12 to the interface card 20. Pin 13 is the LAN card interrupt pin, which transmits the interrupt signal from the interface card 20 to the communication processor 16 of the drive main control card 12. Pin 15 transmits a ready signal or a busy signal from the dual port RAM 22 of the interface card 20 to the main control card 12 of the drive 10. Pin 17 is a no connect (N.C.) pin. The user does not need to connect at this point. The LNALE nomenclature refers to Address Latch Enable coming from the communications processor 16. Pins 19 and 20 send a read control signal and a write control signal respectively from the main control card 12 to the interface card 20. Pins 22-34 transmit interface card address signals (a0-a12). Pin 35 may be connected to a 5V DC power source. Pin 36 is a no connect (NC) pin. The user does not need to connect at this point. The LNACS nomenclature refers to Address Chip Select, coming from the communication processor 16. Pins 37 and 38 connect the main control card 12 with the dual port RAM 22 and control registers 21.

A connector 36 is provided for supplying power to the interface card 20. The connector 36 is preferably a 2PL connector. The connector structure of the 2PL is shown in greater detail in Table 3.

TABLE 3

2PL Connector Definition

| Pin No. | Nomenclature | Description |
|---|---|---|
| 1 | P24 | +24v dc |
| 2 | N24 | N.C. |
| 3 | DCOM | Digital common |
| 4 | P5 | +5V dc |
| 5 | P5 | +5V dc |
| 6 | DCOM | Digital common |

Pin 1 is connected to 24v dc and pins 4 and 5 are both connected to 5V dc. Both pins 3 and 6 are connected to DCOM. A terminal 24, such as a COM1 stab terminal, is provided adjacent the LNPL connector 32 and provides an additional digital common ground (DCOM) connection.

Also as shown in FIG. 3, an interrupt line 31 is provided between the ASIC 26 and the main control card 12. The interrupt line 31 informs the communication processor 16 on the main control card 12 to update the feedbacks and read the setpoints from the dual port RAM 22. Interface code regulates communication between the communication processor 16 and the interface card 20. The interrupt is generated by the ASIC 26 at the end of a communication frame. The data path 30 transmits information from the communications processor 16 to the DPRAM 22 and the ASIC 26.

Figure 4:
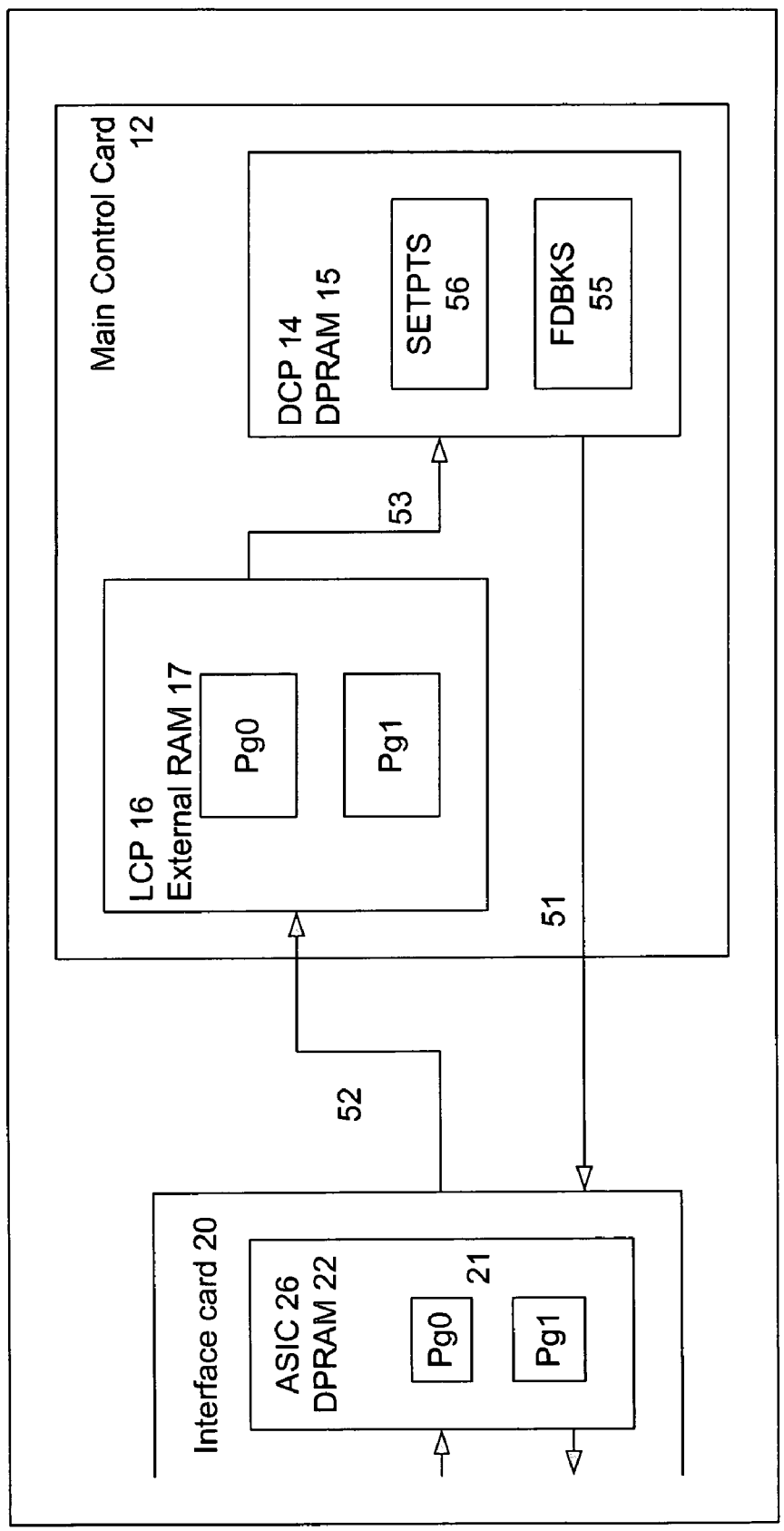
FIG. 4 is a block diagram illustrating the flow of information between an embodiment of the interface card of the invention, the main control card of the drive, the main processor of the drive, and the LAN.

Also shown in FIG. 4, the communication processor 16 reads feedbacks from the DPRAM 15 of the main processor 14 of the control card 12 and loads the feedbacks 55 into the DPRAM 22 via line 51 before the start of the next communication frame. The communication processor 16 will fetch the setpoints or drive references at 52 from the DPRAM 22 and place them into its own external RAM 17. The communication processor 16 will have a one millisecond interrupt that will invoke a change detect on the references in the communication processor external RAM 17 and pass them to the main processor 14 of the control card 12 via line 53.

The communication processor 16 will use a two page scheme in the DPRAM 22 and the external RAM 17 of the communication processor 16. In the two page scheme, both the DPRAM 22 and the external RAM 17 of the communication processor 16 each have an active and an inactive page. When the ASIC interrupt occurs, the communication processor 16 will load the drive feedbacks to the inactive page in the DPRAM 22 via line 51. The communication processor 16 will then switch the active page in the DPRAM 22. The communication processor 16 will then read the setpoints from the ASIC's inactive page after the page swap and write to the communication processor 16 external reference inactive page prior to any page swap in the communication processor 16 via line 52. The communication processor 16 will then switch the active page in the communication processor external RAM 17. During the one millisecond communication processor interrupt, a change detect is performed on the active page in the communication processor external RAM 17 and the communication processor 16 passes the changed data to a dual port RAM 15 the main processor 14 via line 53 after the page swap in the communication processor 16 and stores the data as setpoints 56. In the next LAN update cycle, the ASIC 26 writes the received setpoints, from the LAN, to the new active page and reads the feedbacks from the new active page to pass onto the LAN. The ASIC 26 will initiate an interrupt to the communications processor 16 again.

The communication processor 16 always reads from the DPRAM's inactive page. The references read from the inactive page are written to the inactive page of the LCP external RAM 17. The LCP one millisecond code reads from the active page of the communication processor external RAM 17. A memory map of the dual port RAM 22 is provided in Table 4 below.

TABLE 4

DUAL PORT RAM MEMORY MAP

| AD-DRESS PG0 | AD-DRESS PG1 | SETPOINT | FEEDBACK | AD-DRESS PG0 | AD-DRESS PG1 |
|---|---|---|---|---|---|
| 20 | 120 | Command Bits | Feedback Bits | 60 | 160 |
| 24 | 124 | MMSSETP | Fault | 64 | 164 |
| 28 | 128 | SPDSETP | LCPSFB | 68 | 168 |
| 2C | 12C | LOADADJ | LFBVAR7 | 6C | 16C |
| 30 | 130 | GS1 (Double word) | LCPCFB | 70 | 170 |
| 34 | 134 | GS3DWA | Blank | 74 | 174 |
| 38 | 138 | LANV0SP | LFBVAR1 | 78 | 178 |
| 3C | 13C | LANV1SP | LFBVAR2 | 7C | 17C |
| 40 | 140 | GS3DWB | LFBVAR5 | 80 | 180 |
| 44 | 144 | DRAWSETP | LFBVAR6 | 84 | 184 |
| 48 | 148 | DIAMSETP | SPEEDREF | 88 | 188 |
| 4C | 14C | GS2 (Double word) | Blank | 8C | 18C |
| 50 | 150 | Blank | Blank | 90 | 190 |
| 54 | 154 | Blank | Blank | 94 | 194 |
| 58 | 158 | LANV2SP | LFBVAR3 | 98 | 198 |
| 5C | 15C | LANV3SP | LFBVAR4 | 9C | 19C |

In summary, from a process standpoint, the interrupt is activated by ASIC 26. Drive feedbacks are then written to the inactive page of the DPRAM 22. Next, a DPRAM page swap is performed. Following the page swap, setpoints are read from the DPRAM 22 and stored in the communication processor external RAM 17 inactive page. Next an external RAM page swap is performed. Then an asynchronous 1 millisecond interrupt will detect changed data in the external RAM 17 active page and pass the changed data to the main processor of the drive via DCP DPRAM 14.

It will be apparent to those skilled in the art that various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. An interface card for interfacing a drive to a LAN without modifying a main control card of the drive, the interface card comprising:

a dual port memory interface to the main control card of the drive for receiving feedbacks and transmitting setpoints;

an ASIC for generating an interrupt signal;

an interrupt line that transmits the interrupt signal and informs a communication processor connected on the main control card to update the feedbacks in the dual port memory and read the setpoints from the dual port memory; and control registers for interfacing the communication processor to the LAN.

2. The interface card of claim 1, wherein the ASIC is a controller for interfacing with firmware in the communication processor in order to pass data between a main processor and the interface card.

3. The interface card of claim 1, further comprising a stab terminal for a ground connection.

4. The interface card of claim 1, further comprising a LNPL connector for connecting the interface card with the main control card of the drive.

5. The interface card of claim 1, further comprising a 2PL connector for transmitting power to the interface card.

6. The interface card of claim 1, wherein the LAN is an ISBus LAN.

7. A method for interfacing a drive to a LAN without modifying a main control card of the drive, the main control card including a communications processor and a main processor, the method comprising the steps of:

triggering an interrupt to notify the communications processor on the main control card to update feedbacks in a dual port memory and read setpoints from the dual port memory;

transmitting setpoints from the dual port memory interface to the main processor on the main control card;

transmitting feedback from the main processor on the main control card to the dual port memory interface; and interfacing the communications processor with the LAN with control registers.

8. The method of claim 7, further comprising performing a page swap in the dual port memory after updating the feedbacks in the dual port memory.

9. The method of claim 8, further comprising storing the transmitted set points in a communication processor external RAM inactive page.

10. The method of claim 9, further comprising performing an external RAM page swap.

11. A method for interfacing a drive to a LAN, the drive having a main control card including a communication processor and a main processor, the method comprising the steps of:

providing an interface card having an ASIC, a dual port memory and an interrupt line for transmitting an interrupt signal generated by the ASIC over the interrupt line to the communications processor;

updating feedbacks in an inactive page of the dual port memory;

swapping the inactive page with an active page;

reading setpoints from the inactive page after swapping;

loading setpoints into an external RAM of the communication processor;

performing a page swap on the external RAM of the communication processor; and transmitting setpoints from the active page of the communication processor external RAM to the main processor.

* * * * *